US005743562A

United States Patent [19]
Mottola

[11] Patent Number: 5,743,562
[45] Date of Patent: Apr. 28, 1998

[54] SIMULATOR FOR TEACHING VEHICLE SPEED CONTROL AND SKID RECOVERY

[76] Inventor: Frederik R. Mottola, 390 Maple Ave., Cheshire, Conn. 06410

[21] Appl. No.: 805,344

[22] Filed: Feb. 24, 1997

Related U.S. Application Data

[62] Division of Ser. No. 255,172, Jun. 7, 1994, Pat. No. 5,626, 362.

[51] Int. Cl.$^6$ ..................................................... B60P 3/06
[52] U.S. Cl. ........................... 280/767; 280/81.6; 434/66
[58] Field of Search ............................... 180/198, 209, 180/21, 210; 280/91, 767, 80.1, 661, 81.6; 434/62, 66

[56] References Cited

U.S. PATENT DOCUMENTS

| 4,449,727 | 5/1984 | Roos | 280/91 |
| 4,700,798 | 10/1987 | Johansson et al. | 180/209 |
| 4,998,594 | 3/1991 | Orloski | 180/198 |

FOREIGN PATENT DOCUMENTS

| 2058660 | 7/1993 | Canada | 434/62 |
| 102078 | 3/1984 | European Pat. Off. | 434/66 |
| 2642876 | 8/1990 | France | 434/62 |

*Primary Examiner*—Kevin Hurley

[57] ABSTRACT

An apparatus with a tire that is capable of castering 360 degrees replaces the rear wheels of a front wheel powered automotive vehicle to give drivers an educational experience that simulates the effects excessive speed has upon entry into curves and turns. The rear wheels can remain locked in a non-castering position, whereby the vehicle will perform in a conventional manner. However, under the control of an instructor, the lock can be removed to free the casters, causing the rear of the vehicle to move in the opposite direction from the steering input to simulate a rear wheel skid. When the vehicle on which the invention is mounted is being driven in a straight path the freely castering rear wheels will trail in a straight path. When there is a change in lateral position, such as that which occurs when entering a curve or making a turn, the rear castering wheels will continue to travel in a straight direction causing a lateral acceleration resulting in a rear yaw. The lateral acceleration, or yaw rate, will increase in proportion to the vehicle's velocity and the rate of change in lateral positioning. Therefore, with the invention apparatus and a designed series of learning activities, a trainee can readily experience the effect speed has upon one's ability to control the vehicle when there is a change in lateral positioning.

2 Claims, 6 Drawing Sheets

SIMULATOR FOR TEACHING VEHICLE SPEED CONTROL AND SKID RECOVERY

This application is a division of prior U.S. application Ser. No. 08/255,172 filing date Jun. 7, 1994 and U.S. Pat. No. 5,626,362.

BACKGROUND OF THE INVENTION

1. Field of the Invention

There is a need to provide automobile drivers with an opportunity to experience the effect velocity has upon one's ability to control a vehicle during entry into curves and turns. Many sources of research have revealed that motor vehicle crashes are the leading cause of death among teenagers, and teenage drivers tend to be at fault for their fatal car crashes more often than older drivers. Speeding over allowable limits, or too fast for road conditions and other high risk behaviors are several of the key causes for this tragic loss of young drivers and passengers. There is a need to reinforce current training programs and to make advanced training and remedial driver education available as part of the means to reduce the crash incidents of the youthful driver. Other research has documented that the largest percentage of single vehicle crashes involving the youthful driver occurs at a curve in the roadway. Being that the leading cause of single vehicle crashes for youthful drivers involves excessive speed while entering a curve, effective learning activities are needed to have the driver experience the importance of establishing speed control prior to entering a curve.

Heretofore the most common method for teaching the consequences that occur when a vehicle's handling dynamics exceed the roadway's traction envelope is to conduct a classroom activity. The principal disadvantage of such classroom training is the absence of a visceral experience. The best audio-visual aids, in supplement to a classroom lecture, cannot give a trainee an emotional experience of what it fells like to lose control of a vehicle when the speed of entry into a curve is one mile per hour faster than the traction envelope necessary for tire adhesion. Only a small percentage of drivers experience, during an educational environment, the effect speed has upon the handling qualities of a motor vehicle. The current state of the art, for those programs that do include hands-on-training, is usually achieved by flooding a large level asphalt-surfaced parking lot, or a dedicated location designed for such training, with water or other friction-reducing materials. The speeds at which these exercises are conducted, to generate a sufficient skid, take place in excess of thirty-five miles per hour. With constant lateral acceleration forces being placed upon the vehicle, there is an excessive amount of stress upon the transmission, rear axle, braking system, tires, and steering system of the vehicle. Therefore, the cost of a dedicated vehicle for the training, the expense of maintaining the training car, the requirements of a large paved area, the need for a flat surface, the resistance from neighbors complaining about the noise of screeching tires, the amount of time to set-up and remove the training exercises, all contribute to make this experience costly and geographically prohibitive to the vast majority of drivers. In particular, the newly licensed and youthful driver is most often not able to receive such training.

2. Description of the Prior Art

U.S. Pat. No. 4,449,727 discloses a front wheel drive automotive vehicle with pivotable rear wheels having up to a 10 degree caster for the purpose of teaching race car drivers skid control. U.S. Pat. No. 4,700,798 and U.S. Pat. No. 4,998,594 disclose driver training apparatus for simulating automotive skidding conditions. Both latter patents disclose a frame upon which are attached four castering wheels which are spaced wider than an automotive vehicle. An automotive vehicle is mounted on top of the frame. U.S. Pat. No. 4,700,798 disclosed that the frame is elevated or lowered by the up or down movement of a hydraulic cylinder to put more or less of the vehicle's tires in contact with the road surface by shifting the load more or less onto the castering wheels. As the frame is elevated the automobile's tires are less in contact with the road surface, therefore simulating a reduced-traction condition. U.S. Pat. No. 4,998,594 discloses a frame, supported by four castering wheels which raise or lower the four wheels of an automobile in relation to the road surface by the tilting of forward and rearward articulating axles upon which the castering wheels are mounted; thereby cremating a simulated reduced-traction condition. Neither of the two patents disclose the ability to lock or unlock the swivel action of the caster wheels as means to create a reduced-traction simulated condition in the handling qualities of the vehicle-roadway interaction. Furthermore, none of the cited patents disclose the capability to instantly simulate, within a fraction of a second, the capability to convert the condition that the training vehicle is operating on from an adhesive surface of rolling traction to one of reduced-traction as if the driver suddenly encounters a patch of ice on the roadway surface. A significant disadvantage to these two patents is the high cost of production making it too expensive to be widely adopted in our school systems curriculum for traffic safety education. The massiveness of the apparatus of these patents would reduce the portability of being able to easily and quickly set up activities at a variety of locations in a cost effective manner.

The principle object of this invention is to simulate an automobile being operated in a reduced-traction situation such as that which occurs during excessive speed applications for the condition and configuration of the roadway. Such excessive speed is contributory to vehicular crashes that occur at roadway horizontal curves and complicated during reduced-traction road surface conditions imposed by rain, snow, ice, loose sand and other environmental elements.

Another object of this invention is to teach drivers concepts and skills necessary to recognize the deviation of the vehicle from its longitudinal axis (i.e., it's straight path of travel) early during the commencement of a yaw, enabling drivers to take a corrective steering action before the lateral acceleration exceeds the point of controllability to recover a vehicle's control during a skid situation.

Another object is to provide drivers with opportunites to make risk vs. gain decision as it relates to acceptance of speed and lane position for entering potentially high-risk roadway conditions that occur when the vehicle is cornering.

Still another object is to provide a driver training simulator to give trainees hands-on-experience of how searching techniques affects the control of a vehicle while negotiating a curve or turn.

Yet another object is to provide a driver training simulator to give trainees hands-on-experience of how to recognize the beginning stage of a skidding action and to know how to make corrections to reduce risk.

And another object is to provide a driver training simulator to give trainees hands-on-experience and to be used as a demonstration of how alcohol affects one's driving performance.

SUMMARY OF THE INVENTION

The present invention is an apparatus that replaces the rear wheels of a front wheel powered automobile vehicle. There are two independent units of the apparatus which mount to the rear axle of the vehicle in a similar manner as changing a tire. The existing wheel assembly (ie., tire and rim) of the automobile are removed and replaced with the apparatus of this invention. The mounting plate and supporting brackets for the apparatus are designed to fit the vehicle on which they will be used. Attached to the mounting plate is a pneumatic tire and rim and bearing assembly that is capable of castering 360 degrees.

This invention is distinctive over the aforementioned patents by providing a pair of apparatus assemblies consisting of castering wheels that are mounted to the rear axle of a conventional front wheel drive automotive vehicle. There is a locking device to keep the castering wheels in a fixed position whereby the vehicle will operate in a conventional manner. However, under the control of an instructor, the locking mechanism can be released while the vehicle is driven into a curve or turn configuration defined by traffic cones. This provides an instant release of the castering lock which has the same effect upon the vehicle as that which occurs if a driver were to hit a patch of ice while negotiating a curve. Such an experience creates a visceral experience necessary for effective training.

When the vehicle on which the invention is mounted is being driven in a straight path, the freely castering rear wheels will trail in a straight path. When there is a change in lateral position, such as that which occurs when entering a curve or making a turn, the rear castering wheels will continue to travel in a straight direction causing a lateral acceleration resulting in a rear yaw. The lateral acceleration, or yaw rate, will increase in proportion to the vehicle's velocity and the rate of change in lateral positioning. Therefore, with the invention apparatus and a designed series of learning activities, the driver is able to experience the importance of reducing speed as the primary method to avoid losing control of the vehicle, before entering a situation that places a critical demand upon rolling traction to maintain steering control. Such situations primarily occur while entering curves and turns.

The greater the vehicle's speed, the faster the rear of the vehicle will move in the opposite direction. In a parking lot, or other controlled environment, specially designed exercises can be conducted to have a driver trainee experience the effects that an increase in velocity has upon the ability to control a vehicle while negotiating curves and turns and techniques for recovery of directional control during a skid situation are experienced.

Effective training to provide an emotional experience when going too fast into a curve, or turn, can now be made available to all drivers in an inexpensive way by means of the device in accordance with this invention.

BRIEF DESCRIPTION OF THE DRAWINGS

For the purpose of illustrating the invention there is shown a preferred configuration. However, it is understood that this invention is not limited to the precise arrangements and instrumentalities as shown.

DETAILED DESCRIPTION

Figure 1:
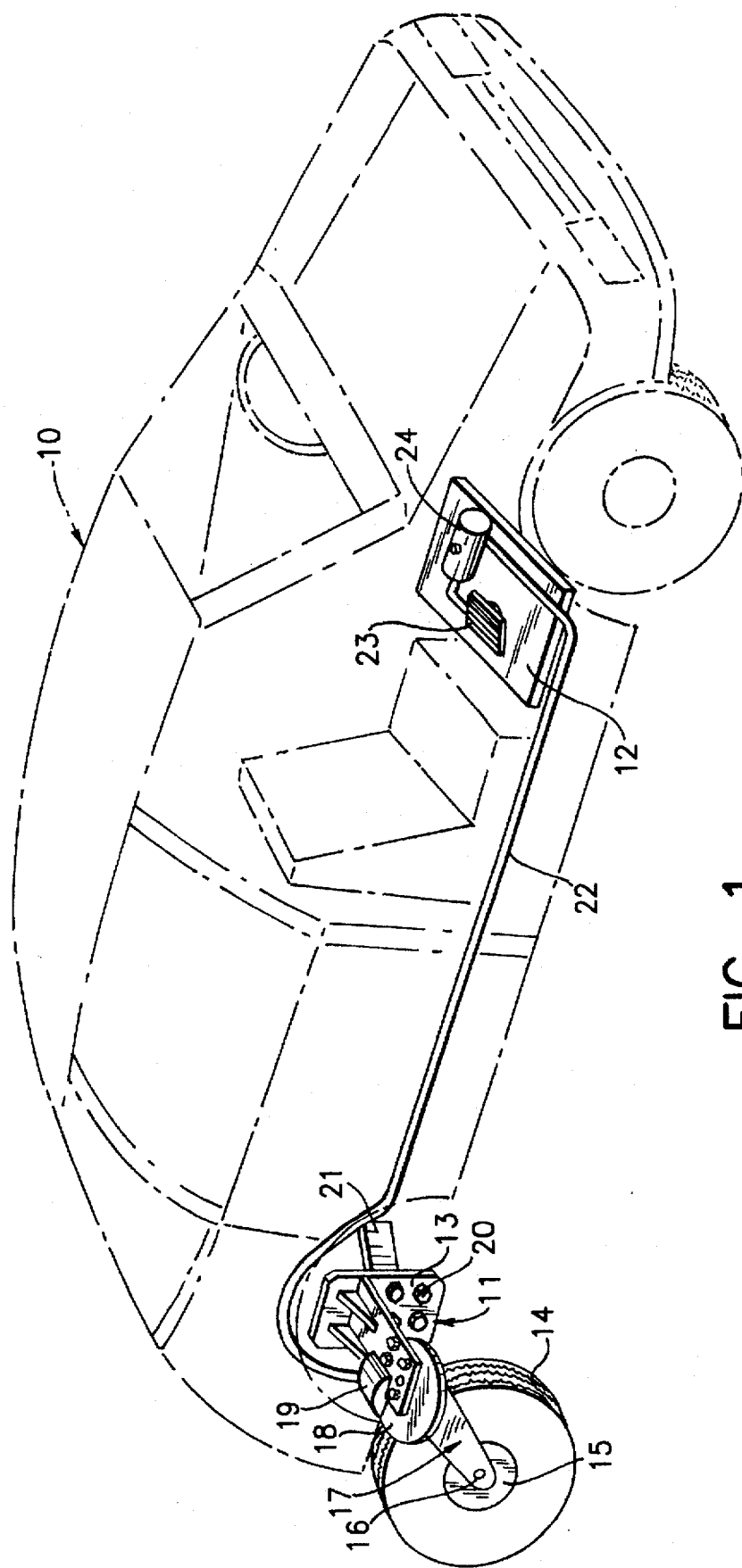
FIG. 1 is a perspective view of the apparatus as mounted on the passenger's side rear axle of a conventional front wheel drive vehicle; the latter is shown with broken lines.

A conventional front wheel drive automobile 10 is shown in FIG. 1 with the castering apparatus 11 mounted with lug nuts 20 up against the rear brake drum 26 on the rear axle 30. A stabilizer bracket 21 connected to the castering apparatus 11 is anchored 35 to the automobile's frame 27, and secured by a safety pin 37 through holes 36 in the anchor 35 to prevent the castering apparatus 11 from rotating on the rear axle 30. The instructor is able to prevent the wheel assembly 17 from castering, or restrict the castering action by depressing a brake pedal 23 that forces hydraulic fluid from a master cylinder 24 through a flexible fluid line 22 that connects to a conventional brake caliper 19. The brake pedal 23 and a conventional master cylinder 24 is mounted on a portable plate 12 that is placed on the floor of the front passenger side without the need to make any modification to the car 10.

Figure 4:
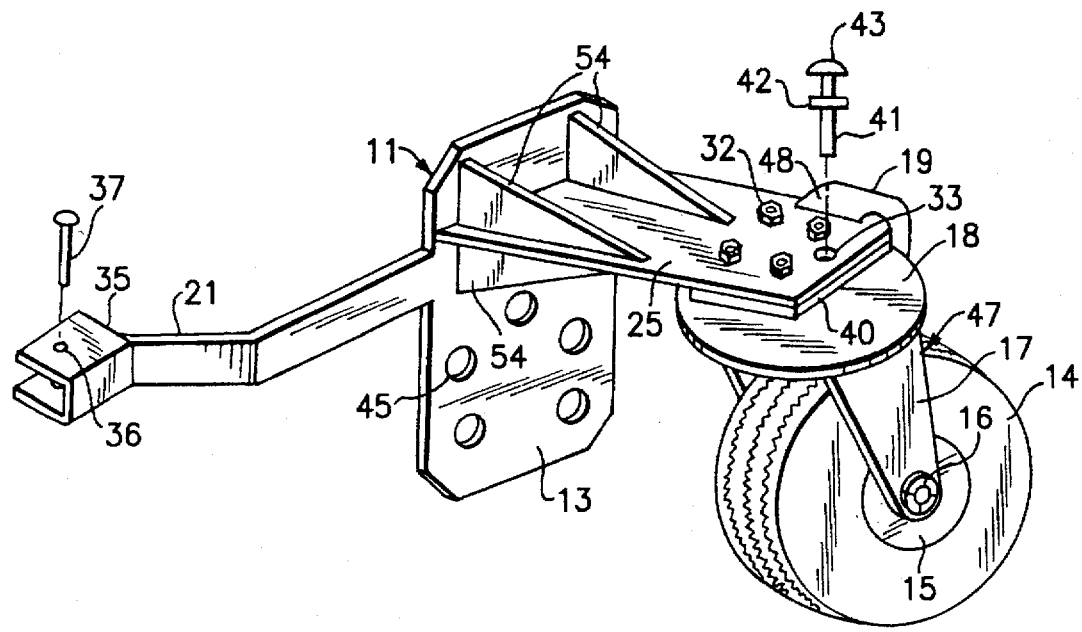
FIG. 4 is a perspective view of the castering assembly designed for the driver's side rear axle.

The castering apparatus 11, as shown in FIG. 4, consists of a mounting plate 13 upon which is bolted 32 a castering wheel assembly 17 which has a pneumatic tire 14 mounted on a rim 15 supported by an axle 16. The wheel assembly 17 which is attached to an angular support frame 47 has a disc 18 attached to receive pressure from a conventional hydraulic brake caliper 19 to stop the castering movement 31 of the wheel assembly 17. The disc 18 and a top plate 40 have a bearing 39 mounted between them to accommodate the castering load.

Figure 6:
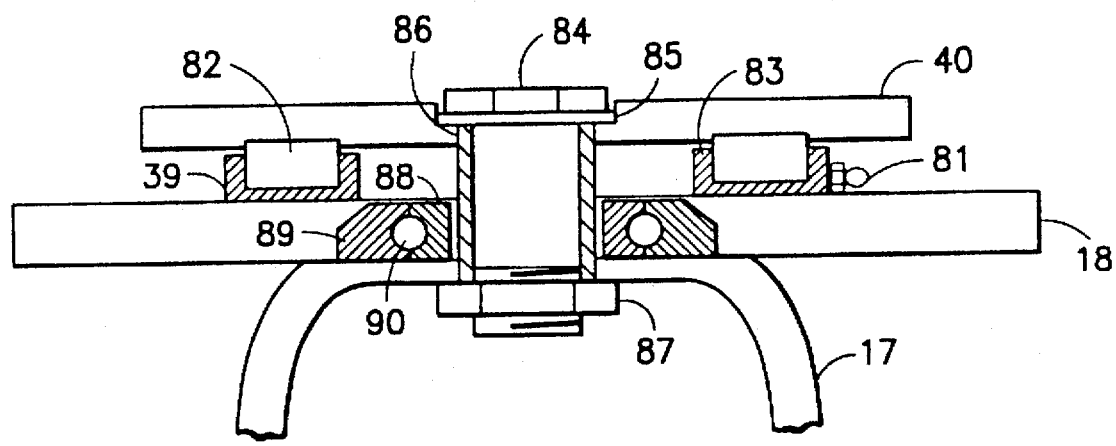
FIG. 6 is a front view of the castering assembly with the bearing component parts being shown in sections.
Figure 7:
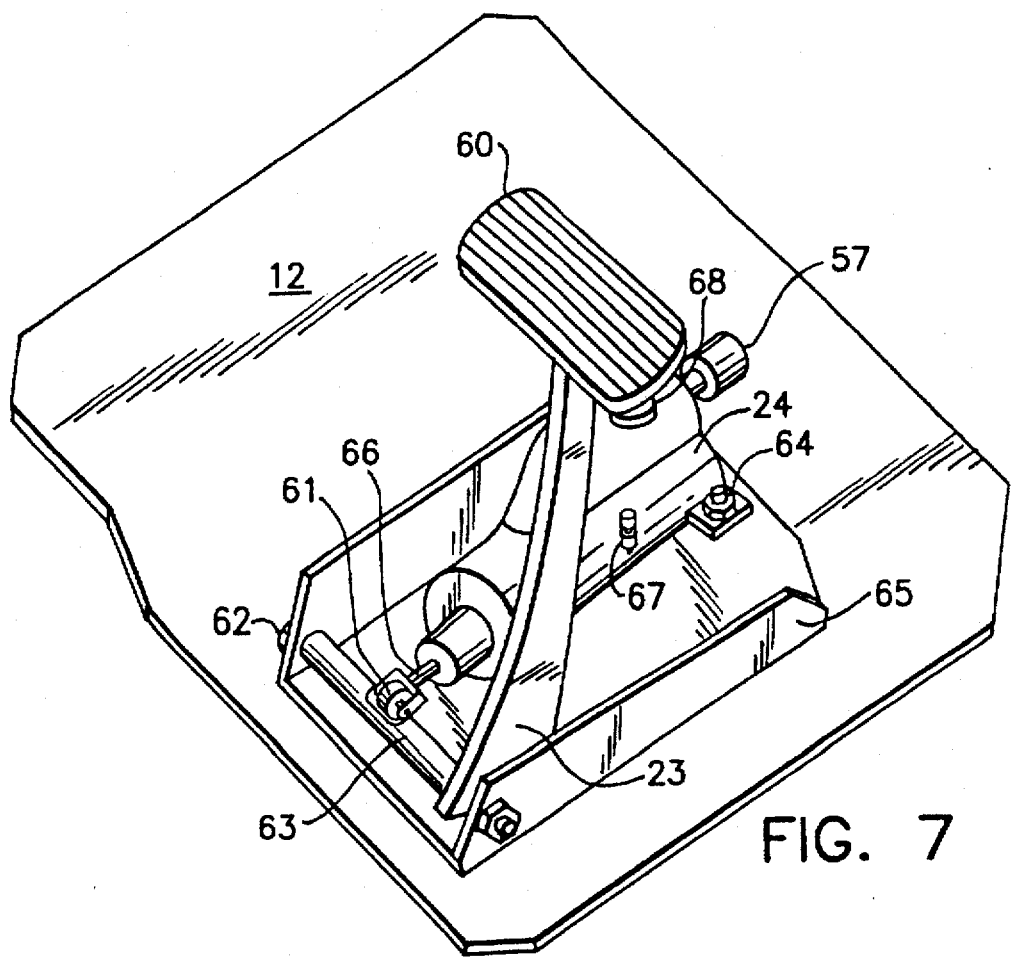
FIG. 7 is a perspective view of the brake pedal and master cylinder.

With the exception of the rotary disc 18 the castering apparatus 11 is conventional and is shown in greater detail in FIG. 6 as shown, the assembly consists of a roller bearing 39 to support vertical thrust with rollers 82 contained in a race 83 with an external lubricant fitting 81. The axial rotation is supported by a ball beating assembly of an outer race 89 and an inner race 88 containing balls 90. The fixed plate 40 is attached to the castering assembly by means of a bolt 84 spacer washer 85 bushing 86 and a nut 87.

The castering wheel assembly 17 is bolted with four bolts 32 on the horizontal plate 25 which is welded to the mounting plate 13 and reinforced by upper and lower gussets 54. Bolting 32 the wheel assembly 17 to the mounting plate assembly 13 makes it possible to easily adapt the invention apparatus to more than one car by attaching the wheel assembly to a new plate assembly 13 that has the hole alignment pattern 45 and the stabilizer bracket 21 designed to fit a second backup car or to fit a replacement car. With a second mounting plate in inventory, a training program can within a matter of a few minutes change the complete assembly from one car to another, eliminating the need to buy a complete unit if one vehicle is not operative.

Figure 2:
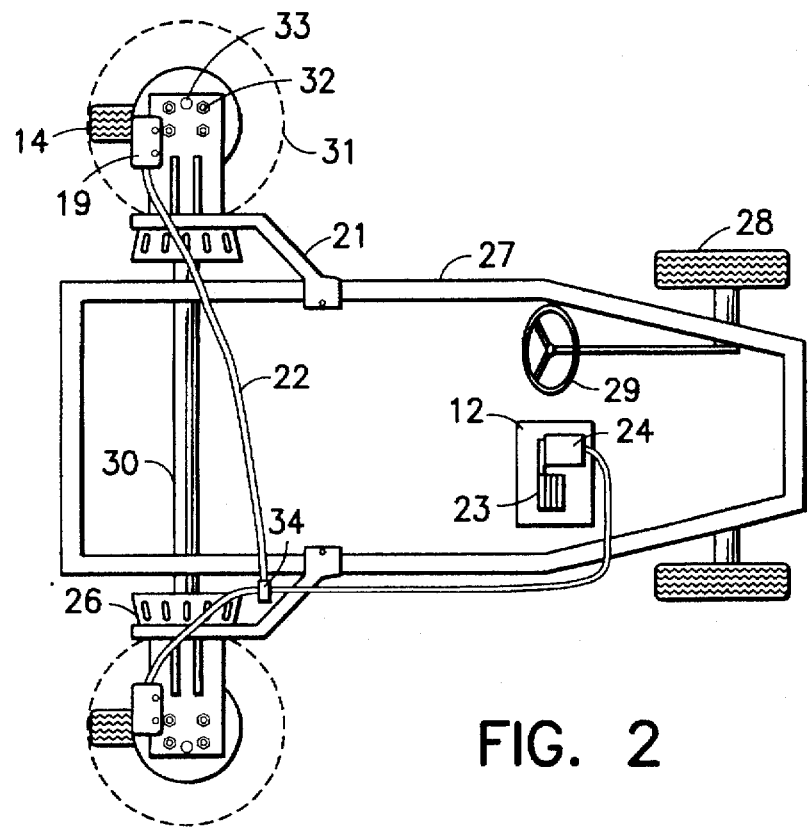
FIG. 2 is a top plan view of the preferred apparatus as mounted on both sides of the rear axle of a conventional front wheel drive vehicle and a locking device, under the instructor's control, to restrict the swivel of the castering action.
Figure 5:
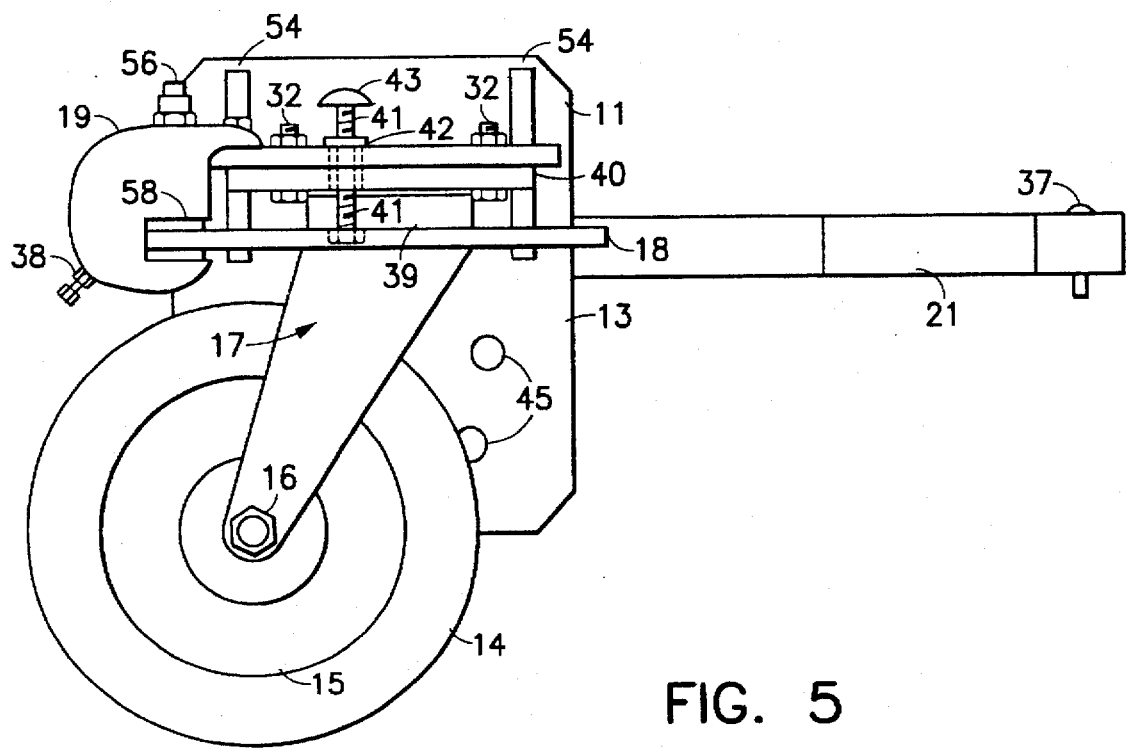
FIG. 5 is a side view of the castering assembly shown in FIG. 4 for the passenger's side.

The hydraulic system, as shown in FIG. 2 and FIG. 5, has fluid lines 22 from the left and right assemblies 11 connected to the caliper 19 by means of a quick connect 56 and formed into one line with a tee connector 34 and connected to the master cylinder 24 by means of a quick connect 57. The caliper is attached with a mounting bracket 48 to the horizontal plate 25. With the use of a no-spill quick connect 56 there is a minimum amount of air introduced into the system during disconnection and connection, however, there are bleed values 38, 67 on the caliper 19 and on the master cylinder 24. The instructor depresses the brake pedal arm 23 which is attached to a cam shaft 63 that has a cam 61 which pushes in the push rod 66 and in a manner known per se puts pressure upon the brake caliper 19 which places the brake pads 58 in contact with the rotary disc 18 to prevent castering of the wheels 17. The caster wheels can also be locked in a fixed position by means of a manual lock pin 41 that is inserted into an aperture 33 in the caster assembly through to the rotary disc 18 to lock the wheels 17 in a straight position. This locking device is helpful when the car needs to be transported from one exercise to another, or when a castering action is not desirable.

Figure 9:
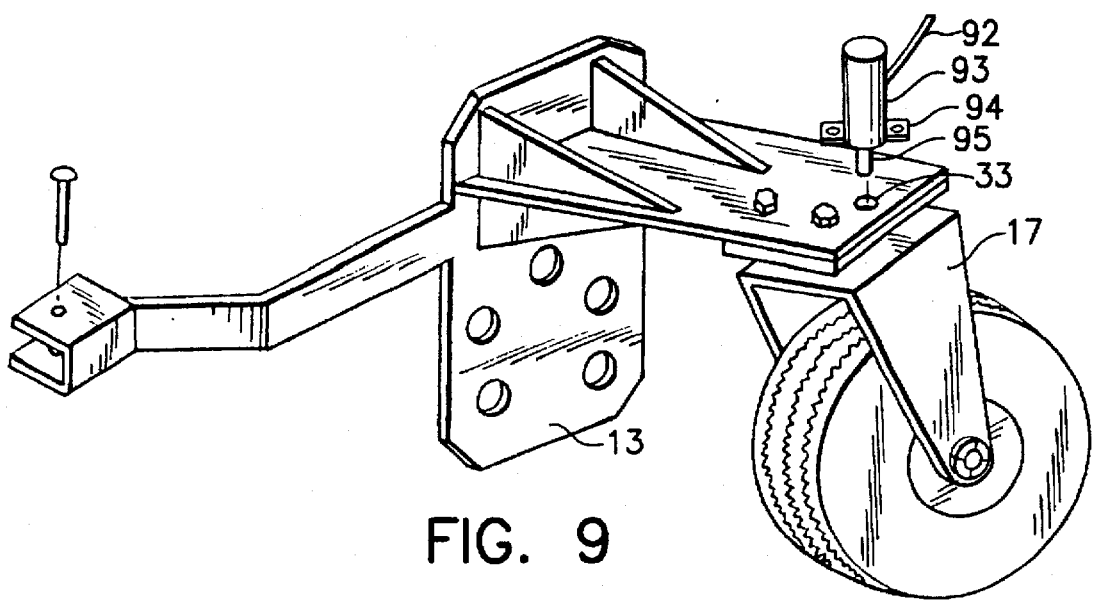
FIG. 9 is a perspective view of the castering assembly showing a solenoid actuated locking device.

Within the scope of this invention it is possible to provide the desirable results by other than the preferred embodiment as stated by the herein descriptions. Such variations are; a car can be equipped with a cable and pulley system whereby the instructor can insert or remove the locking pin 41 by actuating a lever inside the car, much as is known for actuating and releasing a conventional parking brake. The locking and releasing of the caster wheels can also occur by use of electrically powered 92 solenoid 93, as shown in FIG. 9, which can be mounted 94 to the fixed support plate 25 and actuated by a switch under the instructor's control that moves a pin 95 in and out of an aperture 33 or the solenoid can be mounted to move a wedge in or out of a slot on the disc 18, said wedge being anchored to a fixed point to prevent the movement or release of the disc. The hydraulic brake pedal can be replaced with a hand lever or an electrically powered switch to actuate the fluid pressure to act upon the caliper. It is also possible to put and release pressure on the disc 18 by use of a spring and solenoid device.

Figure 8:
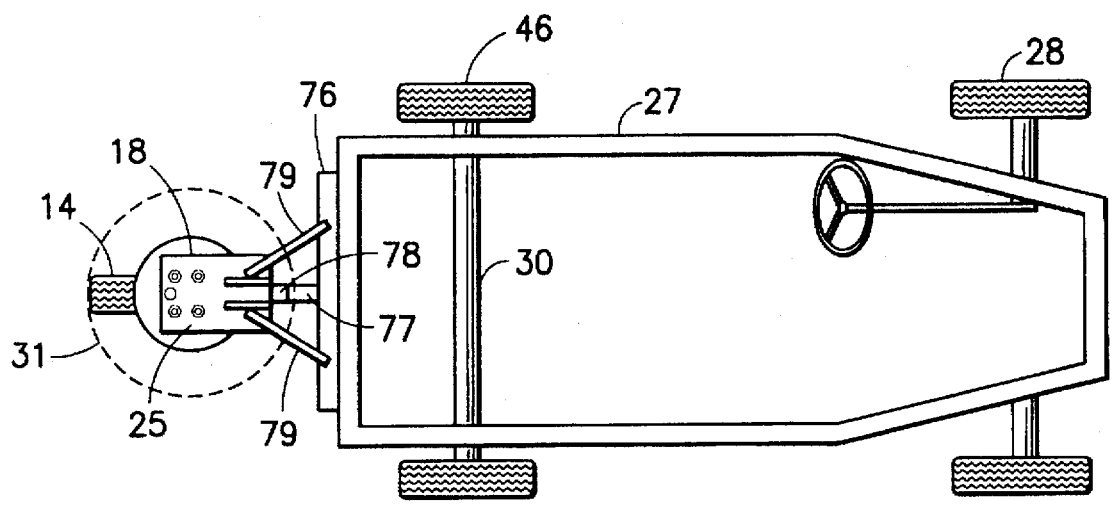
FIG. 8 is a top plan view showing an alternate embodiment to provide a castering wheel mounted to the automotive frame by means of a conventional trailer hitch.

An alternate means for attaching the castering apparatus 11 to the car 10 is shown in FIG. 8 by means of attaching a conventional trailer hitch 76 to the frame 27 whereby a hitch tongue 78 is attached to the support plate 25 and inserted into the receiver channel 77 of the trailer hitch 76. Rotational torque of the castering apparatus 11 is stabilized by bars 79 attached to the support plate 25 and the hitch 76. Insertion of the tongue 78 into the receiver 77 is designed to allow the castering apparatus 11 to elevate the rear tires 46 from contact with the road surface, therefore leaving the rear of the car to be acted upon by the castering effect of the apparatus. There can be two receiver channels 78 located on the trailer hitch 76 to accomodate two castering apparatus 11 if more support is desired. Furthermore, the receiver channels can be attached to the rear axle 30 of the car's frame 27 to receive the tongue 78 of the castering apparatus 11 on either side of the car.

The set-up of a car 10 with the preferred invention apparatus and the conducting of training exercises requires only one person. The instructor can drive to a location with all of the necessary components stored in the trunk of the training car. Because the speeds at which the activites are conducted, generally no faster than 15 m.p.h., are slow, little space is needed and the noise factor of screeching tires that is associated with the current state of the art is minimized to eliminate being a nuisance to the neighbors; therefore, there are many locations that will be suitable and available. Any parking lot with 30 or 40 empty spaces would be adequate.

Figure 10:
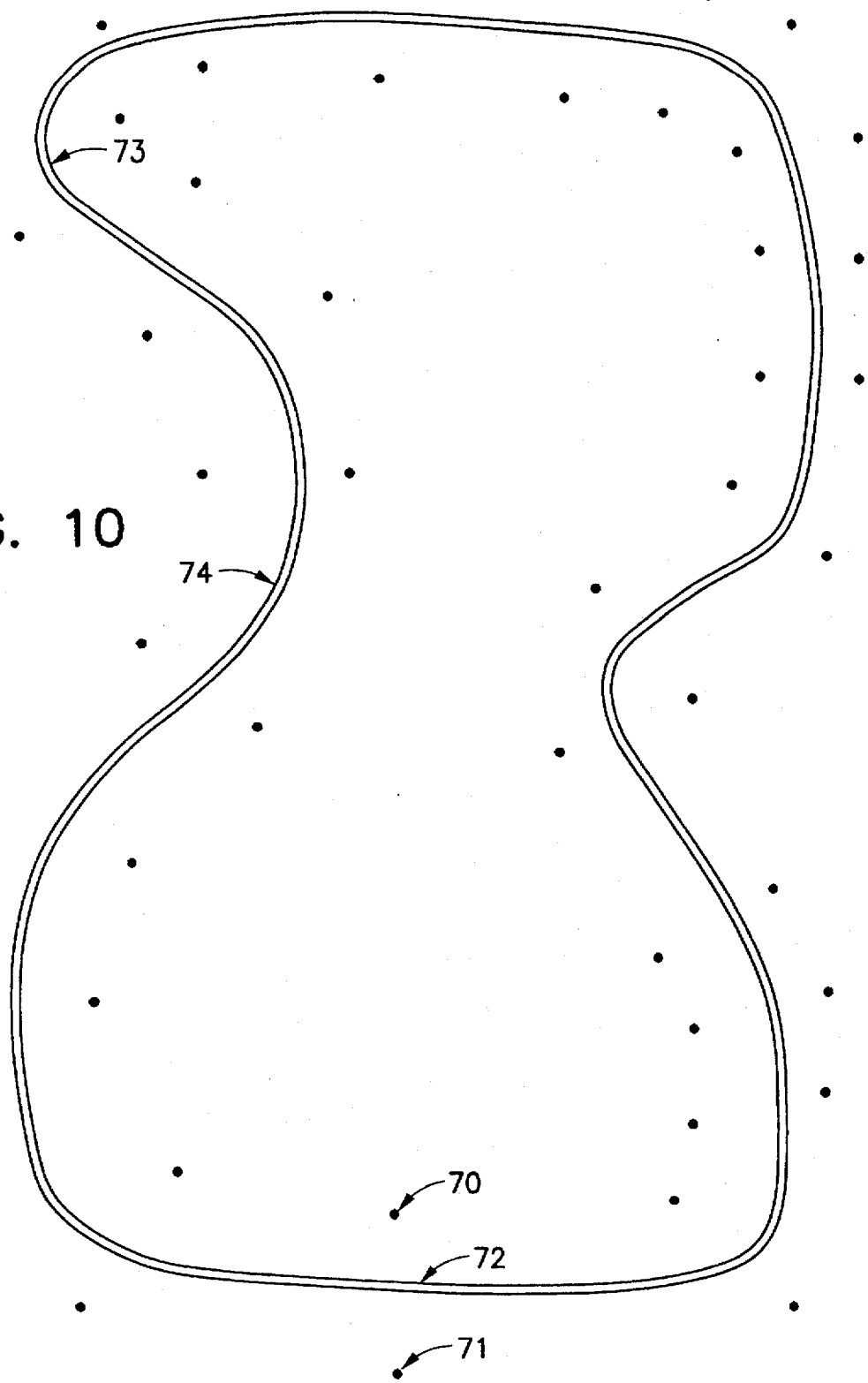
FIG. 10 is a top view of a traffic cone configuration to show one type of course layout to be used for training activities.

Once the instructor arrives at the training site, the components of the invention apparatus are removed from the trunk. The car is jacked up and the rear wheels are removed, one at a time, and replaced with the castering assembly 11. The portable plate 12 for the hydraulic brake system is placed on the front floor of the passenger side. The fluid lines 22 are connected to the quick connects 56, 57. Six inch high traffic cones are laid out into the configuration for the intended activities such as the sample shown in FIG. 10. The inside cones 70 and the outside cones 71 are spaced sixteen feet apart. Having this width is a representation of one lane of a wide two lane roadway; this width gives the trainee opportunities to drive proper and improper lines into the various small radius curves 73 and the large radius curves 74.

Figure 3:
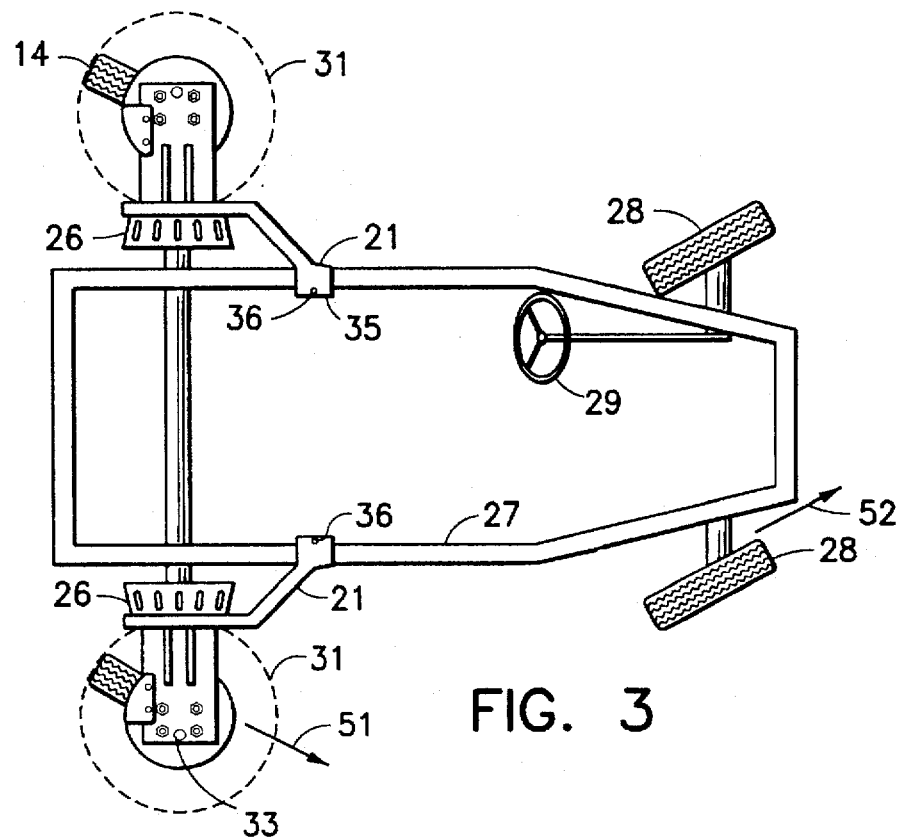
FIG. 3 is a top plan view showing an alternate embodiment to provide a locked or free castering wheel with a manual locking mechanism and it shows the effect turning has upon the castering wheels.

There are a number of designed activites that the apparatus of this invention can achieve which is not possible by any other known devices. Using the configuration in FIG. 10 an instructor states to the trainee that the objective is to drive as fast as possible without hitting any cone and without spinning out of control and at any point along the course the instructor has the option to release the pressure from the brake pedal 23 which will release the lock upon the rotary disc 18 to free the casters. When the driver steers as shown in FIG. 3 to the left 52 the rear of the car will caster to the right 51 to cause a simulated effect as if the driver hit a patch of ice. A stop watch records the time of each run. The trainee has to read the curves, use the best lane position to gain the largest radius of each curve's drive line, know how much acceleration is manageable for the straight stretches and how much reduction must take place at each of the various curves. When a "patch of ice" breaks the rearend away from its longitudinal tracking path a corrective steering action must be made instantly before the yaw exceeds a 25 degree angle. The trainees learn how to recognize the skid yaw at a time when it could be controlled. They also learn that an excessive speed of only a few miles an hour will cause even the driver with the best techniques and quickest reaction to spin out of control. The drivers learn that speed on the approach is the most important concept to achieve consistent control. The high-risk and competitive driver will not gain a good time for their runs through the course unless they use effective lane position, speed control, searching techniques, and skid recovery techniques.

This invention can be use by police departments, civic groups, driver training facilities and other groups, companies, and organizations to give drivers opportunites to experience what it feels like to lose control of a vehicle and what is needed to avoid the same while on an actual roadway. These groups and organizations, especially the police departments, can conduct drunk driving demonstrations by having drivers of drinking age perform the course activities before drinking and then allow the participants to drink enough so they are registering a blood-alcohol-level of 0.05 as measured by a breathalyzer. The participant performs the course again, and the time of the run is recorded.

More alcohol is consumed to a blood-alcohol-level of 0.08–0.09 and the course is driven again. Most drivers will experience a significant increase in the amount of time it takes to successfully complete the course and more failures and wipe-outs as the level of risk increases in proportion to the level of alcohol.

These described activities are not to limit the scope of the invention but are intended to serve as a few examples of how this invented apparatus can be used to increase the educational experience of drivers.

Various alterations, modifications and/or additions may be introduced in the construction and arrangements of parts previously described without departing from the spirit or scope of the invention as defined by the following claims.

What is claimed is:

1. A process for exposing drivers to the effects excessive speed has upon an automotive vehicle negotiating a horizontal roadway curve using a vehicle equipped with at least one castering wheel, comprising:

establishing a course configuration including at least one curve;

steering said vehicle along said course towards said curve with said castering wheel locked; and releasing said castering wheel as said vehicle is steered into said curve allowing said wheels to caster in a direction opposite to said curve, producing a simulated skid.

2. A process according to claim 1 wherein said course configuration includes a multiplicity of curves of a large and small radii.

* * * * *